3,090,857
VAPORIZER
Walter J. Oberg, 8307 N. Elmore Ave., Niles, Ill.
Filed Nov. 2, 1961, Ser. No. 149,617
8 Claims. (Cl. 219—38)

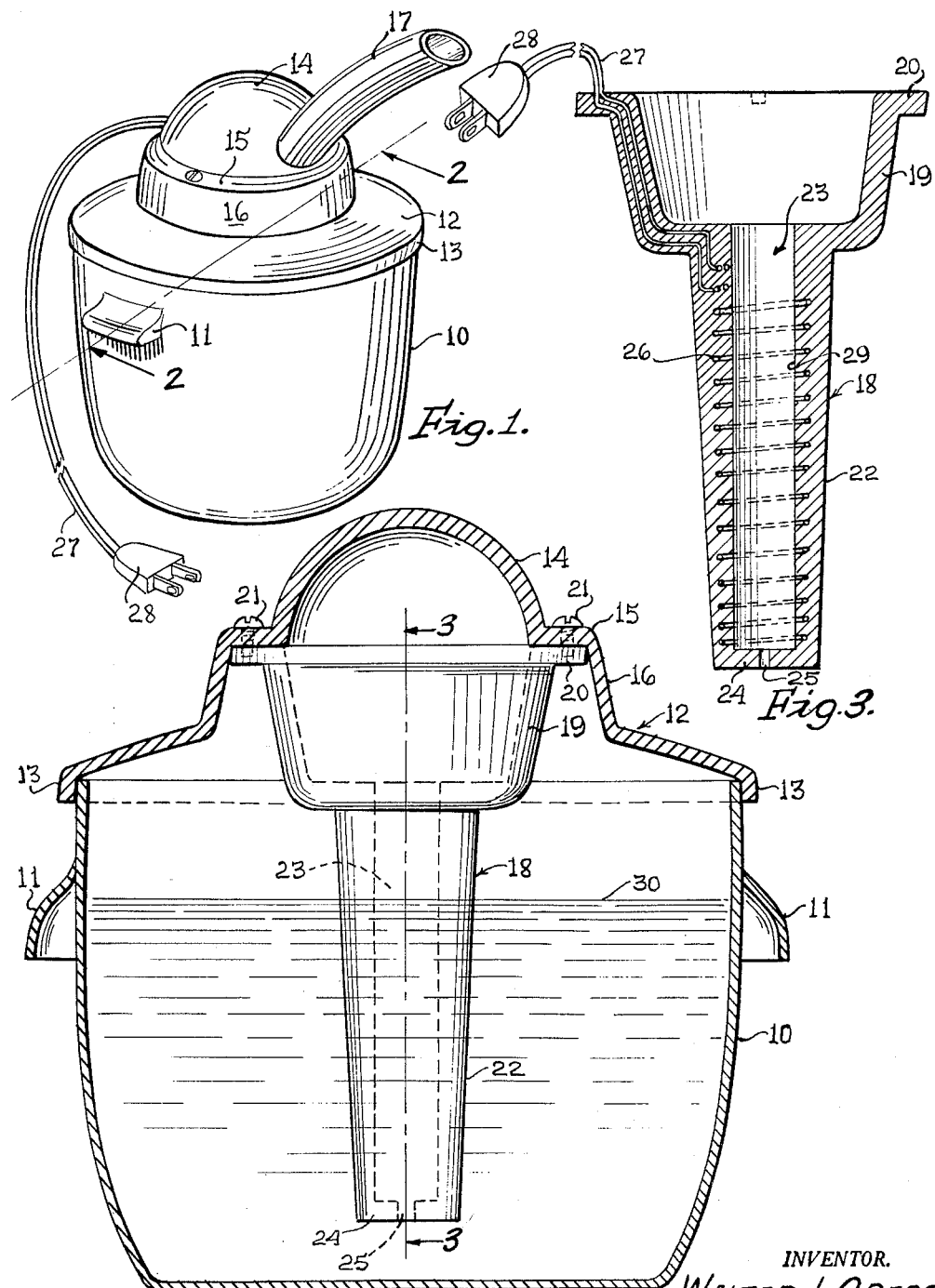

My invention relates to a new and useful improvement in a vaporizer and more particularly to an apparatus employing an immersive type electrical heating element.

A principal object of my invention is in the provision in a vaporizer of this character for imbdding an electrical resistance heating element in a polyester and fiberglass molded plastic immersion unit.

A further object of my invention is in the provision in a vaporizer of this character of providing a sheath for a fluid immersion heating element that is an excellent heat conductor while being a proper electrical insulator.

A still further object of my invention is in the provision of a vaporizer of this character of a vessel immersible in a fluid reservoir container with the vessel having a center passage provided with a bottom opening which is in communication with the interior of the fluid reservoir and through which passage the fluid will pass and be vaporized by a heating element imbedded in the walls of the vessel encircling the passage throughout its longitudinal length, the heating element being imbedded in the walls of the passage in close proximity to the interior surface thereof so as not to heat the surrounding fluid in the reservoir to the point of vaporizing.

An equally important object of my invention is in the provision in a vaporizer of this character of a vaporizing system that requires a minimum amount of electrical power to generate steam or vapor, which desired operation results by reason of the small amount of fluid being vaporized, plus the large heated surface area over which the fluid is being vaporized.

Yet another important object of my invention is in the provision in a vaporizer of this character of a means for maintaining a constant volume of fluid to be vaporized within the vaporizing passage regardless of the varying fluid level in the surrounding reservoir.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a perspective view of my improved vaporizer.

FIG. 2 is a side elevational detailed sectional view taken on line 2—2 of FIG. 1, and FIG. 3 is a side elevational sectional view of the immersible vaporizing or heating element of my invention.

In FIG. 1, I show my improved vaporizer which includes a normally open top container 10 preferably formed of plastic material or the like. This container 10 is provided with integral side handles 11 as shown.

A cover 12 is provided with a circular peripheral depending flange 13 which is adapted to frictionally engage the peripheral edge of the open top of the container 10.

The cover 12 is provided with a center semi-conically shaped dome 14 which includes a laterally extending flange 15 which terminates into a substantially vertically disposed circular side wall 16.

Extending from the dome 14 of the cover 12 is an exhaust spout 17.

The vaporizing or heating element 18 of my invention consists of a molded cup-like vessel 19 having a normally open top. The cup-like vessel 19 is provided with a laterally extending peripheral flange 20 which is adapted to be disposed in facial abutment with the interior surface of the flange 15 of the cover 12 as viewed in FIG. 2. The vaporizing or heating element 18 is removably connected to the cover 12 by means of screws 21 or the like threaded through the flange 15 into the flange 20 of the cup-like vessel of the element 18.

The cup-like vessel 19 is provided with a hollow depending stem 22 which is formed integrally therewith. The stem 22 is provided with a center passage 23 which extends throughout the longitudinal length of the stem 22 and is in open communication with the interior of the cup-like vessel 19. The stem 22 at its lowermost end is partially closed by a flange 24. This flange 24 is provided with a reduced opening 25 which provides restricted communication with the passage 23 as shown in FIG. 3.

The vaporizing or heating element 18 is preferably formed from a polyester and fiberglass molded plastic. Adapted to be woven into the element 18 is a continuous coil of Nichrome wire 26. This wire is connected by an exposed conduit 27 to a conventional electrical plug 28 which is adapted to be connected to a suitable electrical power source not shown. The stem 22 has the wire 26 woven therein in an endless coil encircling the passage 23. The wire is woven in closer proximity to the internal circular wall 29 of the stem 22 as shown in FIG. 3 for a purpose hereinafter explained.

The container 10 is filled with a suitable fluid 30. The cover 12, together with the vaporizing element 18, is then placed on the container 10 with the stem 22 immersed in the fluid 30. The fluid will enter the stem 22 through the opening 25 and seek its own level within the passage 23. When an electrical current is caused to pass through the heating element or wire 26, the fluid within the passage 23 will be brought to a boil and vaporized. The steam or vaporized fluid 30 will then pass into the dome 14 of cover 12 and pass out the spout 17. As heretofore pointed out, the imbedded wire of 26 is in close proximity to the circular wall 29 of the stem 22 which wall 29 defines the passage 23 and, therefore, the fluid within the passage 23 will vaporize while the remaining fluid 30 in the reservoir will not be exposed to sufficient heat so as to cause it to vaporize.

The polyester and fiberglass molded plastic provides an excellent heat conductor while at the same time affords a suitable electrical insulator.

The described structure of my improved vaporizer requires a minimum amount of electrical current to generate the desired vapor by reason of the fact that a reduced amount of liquid 30 is permitted to be introduced within the stem 22 of the heating element 18 and such heating element 18 provides a relatively large heating surface which is in continuous contact with the predetermined amount of fluid within the passage 23. By reason of the fact that the fluid 30 within the passage 23 of the stem 22 of the heating element 18 is constantly being boiled, the amount of fluid within the passage 23 in contact with the heated wall 29 remains consistent throughout the period of vaporizing and does not vary as does the level of the reservoir surrounding the stem 22. By my arrangement, my improved vaporizer will generate at the beginning of its vaporizing cycle the same amount of steam as it will in the end of its vaporizing cycle regardless of the fluid in the reservoir.

By the use of my specific vaporizing element 18, I do not expose a metallic heating element that will tend to oxidize and become ineffective as do the vaporizers well known in the art. My heating element 18 is not adversely affected should, through the process of vaporizing, all of the fluid 30 be exhausted within the reservoir 10. A suitable thermostatic control may be incorporated in my invention without departing from or affecting the same.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An electrical immersion heater for use in a vaporizer including a fluid container comprising a removable cover for said container, a cup-like vessel removably connected to said cover so as to be sealed off from said fluid container when said cover is placed thereon, said vessel having a stem depending therefrom into said fluid container, said stem having formed therein a passage extending throughout its longitudinal length and terminating in open communication with said vessel, said stem at its lower extremity being provided with a restricted opening in communication with said passage and through which fluid to be vaporized is adapted to pass, said heater providing a continuous coil of electrical resistance wire within said stem and convoluted about and in close proximity to the wall defining said passage, whereby the heat therefrom will vaporize only the fluid within said passage, and a conduit carried by said cup-shaped vessel for said wire for connecting the same to an electrical power source.

2. An electrical immersion heater for use in a vaporizer including a fluid container comprising a removable cover for said container, a cup-like vessel removably connected to said cover so as to be sealed off from said fluid container when said cover is placed thereon, said vessel having a stem depending therefrom into said fluid container, said stem having formed therein a passage extending throughout its longitudinal length and terminating in open communication with said vessel, said stem at its lower extremity being provided with a restricted opening in communication with said passage and through which fluid to be vaporized is adapted to pass, said vessel and said stem being formed of non-corrosive insulated molded plastic heat conductive material, the material of said stem having molded therein a continuous coil of electrical resistance wire within said stem and convoluted about and in close proximity to the wall defining said passage, whereby the heat therefrom will vaporize only the fluid within said passage, and a conduit for said wire for connecting the same to an electrical power source.

3. A vaporizing apparatus including a fluid reservoir comprising a closed container, a removable cover for said container, an electrical immersion heater for use in said apparatus comprising a cup-like vessel removably connected to said cover so as to be sealed off from said fluid reservoir when said cover is placed upon said container, said vessel having a stem depending therefrom which is adapted to be immersed in the fluid in said fluid reservoir, said stem having formed therein a passage extending throughout its longitudinal length and terminating in open communication with said vessel, said stem at its lower extremity being provided with a restricted opening in communication with said passage and through which fluid from said reservoir is adapted to pass, said heater providing a continuous coil of electrical resistance wire within said stem and convoluted about and in close proximity to the wall defining said passage, whereby the heat conducted therethrough will vaporize only the fluid within said passage, and a conduit for said wire for connecting the same to an electrical power source.

4. A vaporizing apparatus including a fluid reservoir comprising a closed container, a removable cover for said container, an electrical immersion heater for use in said apparatus comprising a cup-like vessel removably connected to said cover so as to be sealed off from said fluid reservoir when said cover is placed upon said container, said vessel having a stem depending therefrom which is adapted to be immersed in the fluid in said fluid reservoir, said stem having formed therein a passage extending throughout its longitudinal length and terminating in open communication with said vessel, said stem at its lower extremity being provided with a restricted opening in communication with said passage and through which fluid from said reservoir is adapted to pass, said vessel and said stem being formed of non-corrosive insulated molded plastic heat conductive material, the material of said stem having molded therein a continuous coil of electrical resistance wire within said stem and convoluted about and in close proximity to the wall defining said passage, whereby the heat conducted therethrough will vaporize only the fluid within said passage, and a conduit for said wire for connecting the same to an electrical power source.

5. A vaporizing apparatus including a fluid reservoir comprising a closed container, an electrical vaporizer within said container and having a hollow portion immersed into the fluid in said fluid reservoir, a cup-shaped support for said hollow portion carried by said container above the fluid in said reservoir, said hollow portion of said vaporizer comprising an immersible heating element formed of a resistor conductor embedded in electrical insulating heat conductive material, means for providing a restricted heat conductive area within said hollow portion of said vaporizer, and means for introducing a determined amount of fluid from said fluid reservoir into contact with said restricted heat conductive area within said hollow portion for vaporization into said cup-shaped support.

6. A vaporizing apparatus including a fluid reservoir comprising a closed container, an electrical vaporizer within said container and having a hollow portion immersed into the fluid in said fluid reservoir, a cup-shaped support for said hollow portion carried by said container above the fluid in said reservoir, said hollow portion of said vaporizer comprising an immersible heating element formed of a resistor conductor embedded in electrical insulating heat conductive mtaerial, said hollow portion providing a passage extending throughout its longitudinal length with the wall thereof providing a restricted heat conductive area, and means for introducing a determined amount of fluid from said fluid reservoir into said passage and into contact with said restricted heat conductive area within said hollow portion for vaporization into said cup-shaped support.

7. A vaporizing apparatus including a fluid reservoir comprising a closed container, an electrical vaporizer within said container and having a hollow portion immersed into the fluid in said fluid reservoir, a cup-shaped support for said hollow portion carried by said container above the fluid in said reservoir, said hollow portion of said vaporizer comprising an immersible heating element formed of a resistor conductor embedded in electrical insulating heat conductive material, means for providing a restricted heat conductive area within said hollow portion of said vaporizer, and a restricted opening provided by said hollow portion through which a determined amount of fluid from said reservoir is permitted to pass into contact with said restricted heat conductive area with said hollow portion for vaporization into said cup-shaped support.

8. A vaporizing apparatus including a fluid reservoir comprising a closed container, an electrical vaporizer within said container and having a hollow portion immersed into the fluid in said fluid reservoir, a cup-shaped support for said hollow portion carried by said container above the fluid in said reservoir, said hollow portion of said vaporizer comprising an immersible heating element formed of a resistor conductor embedded in electrical insulating heat conductive material, said hollow portion providing a passage extending throughout its longitudinal length with the wall thereof providing a restricted heat conductive area, a restrictive opening provided at said hollow portion through which a determined amount of fluid from said reservoir is permitted to pass into said passage and into contact with said restricted heat conductive area within said hollow portion for vaporization into said cup-shaped support.

References Cited in the file of this patent

UNITED STATES PATENTS

| | | |
|---|---|---|
| 1,359,390 | Kuhn et al. | Nov. 16, 1920 |
| 2,146,402 | Morgan | Feb. 7, 1939 |
| 2,523,261 | Alvarez et al. | Sept. 26, 1950 |
| 2,727,979 | Altosaar | Dec. 20, 1955 |
| 2,847,548 | Gordon et al. | Aug. 12, 1958 |

FOREIGN PATENTS

| | | |
|---|---|---|
| 83,645 | Switzerland | June 1, 1920 |